(12) United States Patent
Sun et al.

(10) Patent No.: US 10,861,480 B2
(45) Date of Patent: Dec. 8, 2020

(54) METHOD AND DEVICE FOR GENERATING FAR-FIELD SPEECH DATA, COMPUTER DEVICE AND COMPUTER READABLE STORAGE MEDIUM

(71) Applicant: BEIJING BAIDU NETCOM SCIENCE AND TECHNOLOGY CO., LTD., Beijing (CN)

(72) Inventors: Jianwei Sun, Beijing (CN); Chao Li, Beijing (CN); Xin Li, Beijing (CN); Weixin Zhu, Beijing (CN); Ming Wen, Beijing (CN)

(73) Assignee: BEIJING BAIDU NETCOM SCIENCE AND TECHNOLOGY CO., LTD., Beijing (CN)

( * ) Notice: Subject to any disclaimer, the term of this patent is extended or adjusted under 35 U.S.C. 154(b) by 237 days.

(21) Appl. No.: 16/228,656

(22) Filed: Dec. 20, 2018

(65) Prior Publication Data
US 2019/0228791 A1 Jul. 25, 2019

(30) Foreign Application Priority Data
Jan. 23, 2018 (CN) .......................... 2018 1 0064909

(51) Int. Cl.
| | | |
|---|---|---|
| *H04R 3/00* | (2006.01) | |
| *H04R 29/00* | (2006.01) | |
| *G10L 21/0272* | (2013.01) | |
| *G10L 21/0208* | (2013.01) | |
| *G10L 21/0316* | (2013.01) | |
| *G10L 25/78* | (2013.01) | |
| *G10L 25/48* | (2013.01) | |
| *G10L 15/06* | (2013.01) | |
| *G10L 21/00* | (2013.01) | |
| *G10L 25/21* | (2013.01) | |

(52) U.S. Cl.
CPC ...... *G10L 21/0272* (2013.01); *G10L 21/0208* (2013.01); *G10L 21/0316* (2013.01); *G10L 25/48* (2013.01); *G10L 25/78* (2013.01); *G10L 15/063* (2013.01); *G10L 21/00* (2013.01); *G10L 25/21* (2013.01)

(58) Field of Classification Search
CPC .................................. H04R 3/00; H04R 29/00
See application file for complete search history.

(56) References Cited

U.S. PATENT DOCUMENTS

| | | | |
|---|---|---|---|
| 2009/0018826 A1* | 1/2009 | Berlin | G10L 15/07 704/223 |
| 2009/0060222 A1* | 3/2009 | Jeong | H04R 3/005 381/92 |
| 2012/0237037 A1* | 9/2012 | Ninan | H04S 7/304 381/17 |
| 2018/0033428 A1* | 2/2018 | Kim | G10L 15/22 |
| 2018/0350379 A1* | 12/2018 | Wung | G10L 21/0364 |
| 2019/0228791 A1* | 7/2019 | Sun | G10L 21/0316 |

* cited by examiner

*Primary Examiner* — Shreyans A Patel
(74) *Attorney, Agent, or Firm* — Lathrop GPM LLP

(57) ABSTRACT

Embodiments of the present disclosure provide a method and a device for generating far-field speech data, a computer device and a computer readable storage medium. The method includes obtaining environmental noise in real environment and adjusting near-field speech data in a near-field speech data set based on the environmental noise, further includes generating far-field speech data based on adjusted near-field speech data and the environmental noise.

20 Claims, 5 Drawing Sheets

METHOD AND DEVICE FOR GENERATING FAR-FIELD SPEECH DATA, COMPUTER DEVICE AND COMPUTER READABLE STORAGE MEDIUM

CROSS-REFERENCE TO RELATED APPLICATION

This application claims priority to and benefits of Chinese Patent Application Serial No. 201810064909.1, filed on Jan. 23, 2018, the entire content of which is incorporated herein by reference.

FIELD

The present disclosure relates to a speech data processing field, and more particularly to a method and a device for generating far-field speech data, a computer device and a computer readable storage medium.

BACKGROUND

Speech recognition refers to automatically recognize content of a speech using a machine, such as a computer. The speech recognition is widely used in many scenes, such as text input, smart home appliance control, car navigation, and the like. In order to perform the speech recognition, the computer may establish a speech recognition model, which generally includes a linguistic model and an acoustic model. During establishing the speech recognition model, a large amount of labeled training data is required for training. In general, the more training data, the higher the accuracy of the trained speech recognition model.

According to different distance scenes, the speech recognition model can be divided into a near-field speech recognition model and a far-field speech recognition model. The near field speech recognition model refers to enabling a computer to recognize speech under a short distance condition, such as in a process of using a speech input method. The far field speech recognition model refers to enabling a computer to recognize speech under a long distance condition, such as in a smart speaker or a car navigation process. In a far-field speech recognition scene, due to a large amount of environmental noise and reverberation in real environment, quality of picked-up signal is degraded, so accuracy of the far-field speech recognition is lower than that of the near-field speech recognition.

SUMMARY

According to embodiments of a first aspect of the present disclosure, a method for generating far-field speech data is provided. The method includes: obtaining environmental noise in real environment; adjusting near-field speech data in a near-field speech data set based on the environmental noise; and generating far-field speech data based on adjusted near-field speech data and the environmental noise.

According to embodiments of a second aspect of the present disclosure, a device for generating far-field speech data is provided. The device includes: an obtaining module, configured to obtain environmental noise in real environment; an adjusting module, configured to adjust near-field speech data in a near-field speech data set based on the environmental noise; and a generating module, configured to generate far-field speech data based on adjusted near-field speech data and the environmental noise.

According to embodiments of a third aspect of the present disclosure, a computer device is provided, including: one or more processors, and a memory, configured to store one or more programs. When the one or more programs are executed by the one or more processors, the method or process according to embodiments of the present disclosure is performed by the computer device.

According to embodiments of a fourth aspect of the present disclosure, a computer readable storage medium is provide, having a computer program stored thereon, wherein when the computer program is executed by the one or more processors, the method or process according to embodiments of the present disclosure is performed by the computer device.

It should be understood that, the content described in the summary of the present disclosure is not intended to limit the key or important features of the embodiments of the present disclosure, and is not intended to limit the scope of the present disclosure. Other features of the present disclosure will be readily understood from the following descriptions.

BRIEF DESCRIPTION OF THE DRAWINGS

These and other aspects and advantages of embodiments of the present disclosure will become apparent and more readily appreciated from the following descriptions made with reference to the drawings, in which the same or similar reference numerals indicate the same or similar elements.

DETAILED DESCRIPTION

Figure 1:
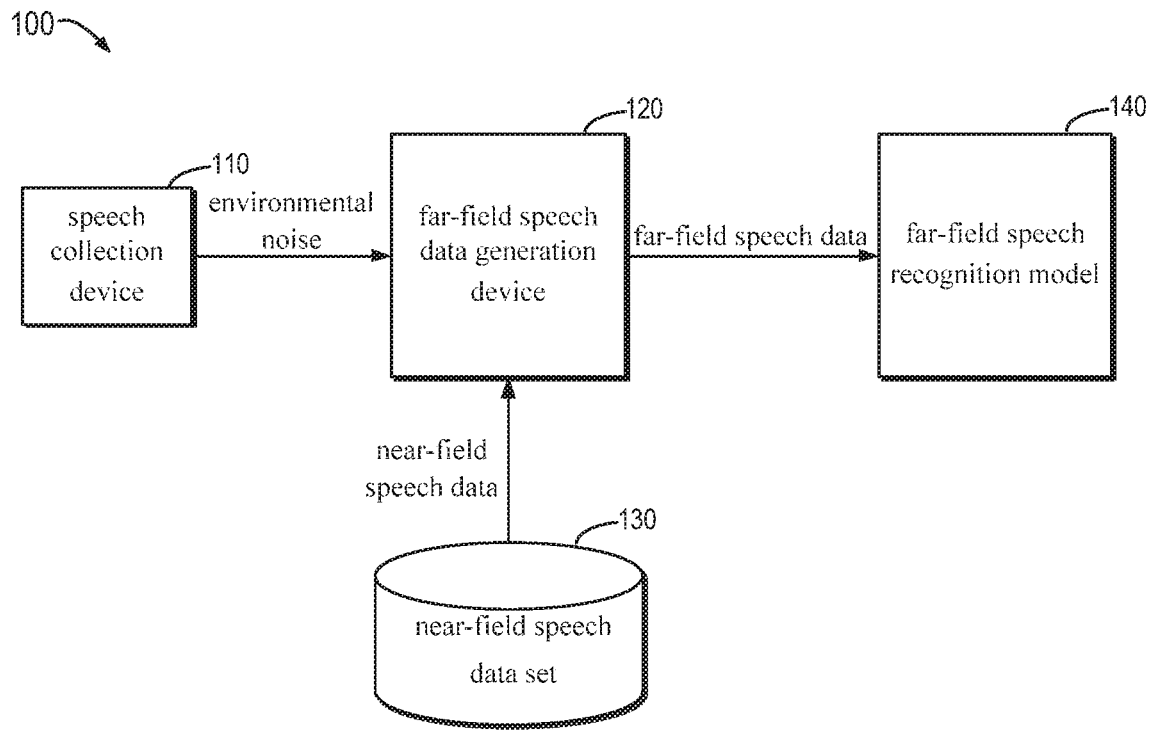
FIG. 1 is a schematic diagram illustrating a sample environment in which embodiments of the present disclosure may be realized.

Embodiments of the present disclosure will be described in more detail below with reference to the accompanying drawings. Although certain embodiments of the present disclosure are shown in the drawings, it should be understood that the present disclosure may be implemented in various forms and should not be construed as limited to the embodiments set forth herein. In contrast, these embodiments are provided for a more complete understanding of the present disclosure. It should be understood that the drawings and embodiments of the present disclosure are for illustrative purposes only and are not intended to limit the scope of the disclosure.

In the description of the embodiments of the present disclosure, the term "comprise" and the like are to be understood as open contains, i.e., "including but not limited to". The term "based on" should be understood to mean "based at least in part". The term "one embodiment" or "an embodiment" should be understood to mean "at least one embodiment". The terms "first", "second", and the like may refer to different or same objects unless the context clearly indicates otherwise. Other explicit and implicit definitions may also be included below.

Training a far-field speech recognition model requires a large amount of far-field speech data, while real far-field speech data samples are relatively few. Therefore, the far-field speech data containing noise may be simulated by adding noise to near-field speech data at present. A traditional noise adding mode performs the noise adding by adjusting amplitude of the noise based on speech. However, this mode often does not match user's speaking habits in real environment. For example, a user often speaks loudly in noisy environment, and voices tend to be smaller in quiet environment. The noise in these different scenes does not change with the user's like. Instead, the user adjusts the size of his or her voice in different scenes. Therefore, the traditional noise adding mode cannot objectively and effectively reflect an objective relationship between the user's voice (such as volume) and environmental noise in a real far-field environment.

Embodiments of the present disclosure provide a technical solution for generating far-field speech data. With embodiments of the present disclosure, during generating far-field speech data based on near-field speech data through simulation, the near-field speech data is adjusted based on the real environmental noise, such that the far-field speech data generated through the simulation is more objective and real. In addition, with embodiments of the present disclosure, by comparing between a plurality of signal-to-noise ratios, the generated far-field speech data is more realistically and objectively approximate characteristics of far-field environment. Further, it is verified whether the generated far-field speech data conforms to a actual signal-to-noise ratio range, thus ensuring reliability of the generated far-field speech data. In addition, the far-field speech data generated in accordance with embodiments of the present disclosure may be used to train a far-field speech recognition model.

It should be noted that, in the described embodiments, the term "far-field speech data" may refer to substantially no-noise speech data obtained within a relatively small distance (for example, within 20 centimeter), and the term "near-field speech data" may refer to noisy speech data collected or simulated at a relatively long distance (for example, 1 meter or more). In the following, some embodiments of the present disclosure will be described with reference to FIGS. 1 to 8.

FIG. 1 is a schematic diagram illustrating a sample environment 100 in which embodiments of the present disclosure may be realized. The sample environment 100 may be used for generating far-field speech data. The generated far-field speech data illustrated in FIG. 1 may be used for training a far-field speech recognition model. As illustrated in FIG. 1, the sample environment 100 includes a speech collection device 110, a far-field speech data generation device 120, a near-field speech data set 130, and a far-field speech recognition model 140.

The speech collection device 110 is configured to collect noise in in real environment. In some embodiments, the speech collection device 110 may further collect a certain amount of far-field speech data to form a far-field speech data set. Real distribution ranges of signal-to-noise ratio in different scenes can be determined based on the far-field speech data set. In some embodiments, scenes of using far-field speech recognition may include a plurality of types, such as home, in-vehicle, and the like. For each type of scene, a real distribution range of signal-to-noise ratio in this type of scene is determined according to actually collected data.

The far-field speech data generation device 120 is configured to simulate and generate the far-field speech data based on environmental noise obtained from the speech collection device 110 and near-field speech data in the near-field speech data set 130. The near-field speech data set 130 is established by labeling near-field speech data pre-collected (i.e., quiet speech substantially without noise). It may include a text label, a state label of each speech segment. As illustrated in FIG. 1, the far-field speech data generated by the far-field speech data generation device 120 may be output to the far-field speech recognition model 140 for training.

With embodiments of the present disclosure, the far-field speech data generation device 120 may generate simulated far-field speech data. For example, the far-field speech data generation device 120 may adjust the near-field speech data based on the environmental noise, so as to generate more real far-field speech data. In the following, exemplary implementation of adjusting the near-field speech data is further described with reference with FIGS. 2 to 4.

Figure 2:
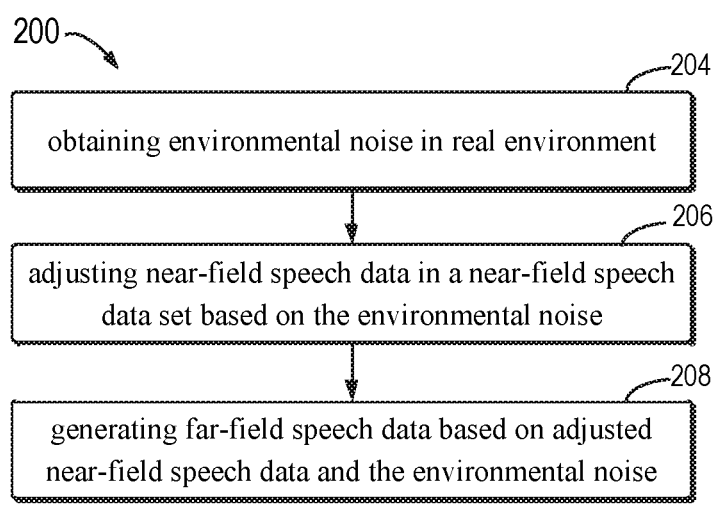
FIG. 2 is a flow chart of a method for generating far-field speech data according to an embodiment of the present disclosure.

FIG. 2 is a flow chart of a method 200 for generating far-field speech data according to an embodiment of the present disclosure. It should be understood that, the method 200 may be implemented by the far-field speech data generation device 120 illustrated in FIG. 1.

At block 204, environmental noise in real environment is obtained. For example, the far-field speech data generation device 120 obtains the environmental noise actually collected in a real scene from the speech collection device 110. Any speech collection device currently known or developed in the future may be combined with embodiments of the present disclosure to obtain the environmental noise in the real environment.

It should be understood by the skilled in the art that the environmental noise refers to sound generated in social life that interferes with surrounding living environment, which affects the recognition of target speech (for example, speech spoken by a user) by the speech recognition model. A type of the noise data may be combined with an actual scene. For example, a smart speaker generally used at home, the noise may be noise from a television, a refrigerator, an air conditioner, a washing machine, and the like.

In some embodiments, after the speech collection device 110 collects the environmental noise, the speech collection device 110 may count amplitude values of the environmental noise to obtain a mean value and a variance of signal amplitude values of the environmental noise, and may adjust the signal amplitude values of the environmental noise based on the mean value and the variance. For example, random small-range adjustment may be performed on the environmental noise based on the mean value and the variance. In such a way, diversity of the collected noise may be increased.

At block 206, near-field speech data in a near-field speech data set is adjusted based on the environmental noise. The near-field speech data set is established by labeling quiet near-field speech data pre-collected. The near-field speech data set may include a text label, a state label of each speech segment. With the embodiments of the present disclosure, the far-field speech data generation device 120 adjusts the near-field speech data based on the environmental noise. For example, in a relatively quiet environment, such as at home, the voice of the user may be relatively low, thus the quiet near-field speech data may be enhanced in small increments. While in a relatively noisy environment, such as in a car, the user often needs to speak loudly, thus the quiet near-field speech data may be enhanced in large increments. In such a way, noise adding on the speech may be realized based on the noise, thus making the speech data added noise more objective and realistic. In the following, exemplary implementation of adjusting the near-field speech data based on the environmental noise is further described with reference with FIG. 3.

At block 208, far-field speech data is generated based on adjusted near-field speech data and the environmental noise. For example, the far-field speech data generation device 120 may perform noise adding processing on the adjusted near-field speech data using the environmental noise, thus generating simulated far-field speech data. In some embodiments, reverberation adding processing may further be performed on the generated speech data. Since the generated far-field speech data has the labeled state in the near-field speech data and is objective and realistic, the generated far-field speech data may be used for training a far-field speech recognition model.

It should be understood that, far-field speech data samples can be obtained through actual collection, however requirements for collecting far-field speech data are relatively high, far-field speech data is difficult to collect and has relatively few data samples, which cannot meet the demands for training a large-scale far-field speech recognition model. In contrast, the near-field speech data is easier to collect and has more data samples. Therefore, a large amount of far-field speech training data may be obtained by simulating the far-field speech data based on the near-field speech data.

With embodiments of the present disclosure, the near-field speech data is adjusted based on the real environmental noise, such that the far-field speech data generated through the simulation is more objective and real. In addition, it should be understood that, the far-field speech data generated in the embodiments of the present disclosure may be used for training a far-field speech recognition model, so as to improve performance of far-field speech recognition. For example, the generated far-field speech data may be used in training a far-field speech recognition acoustic model used in a smart speaker, a car navigation process, and the like.

Figure 3:
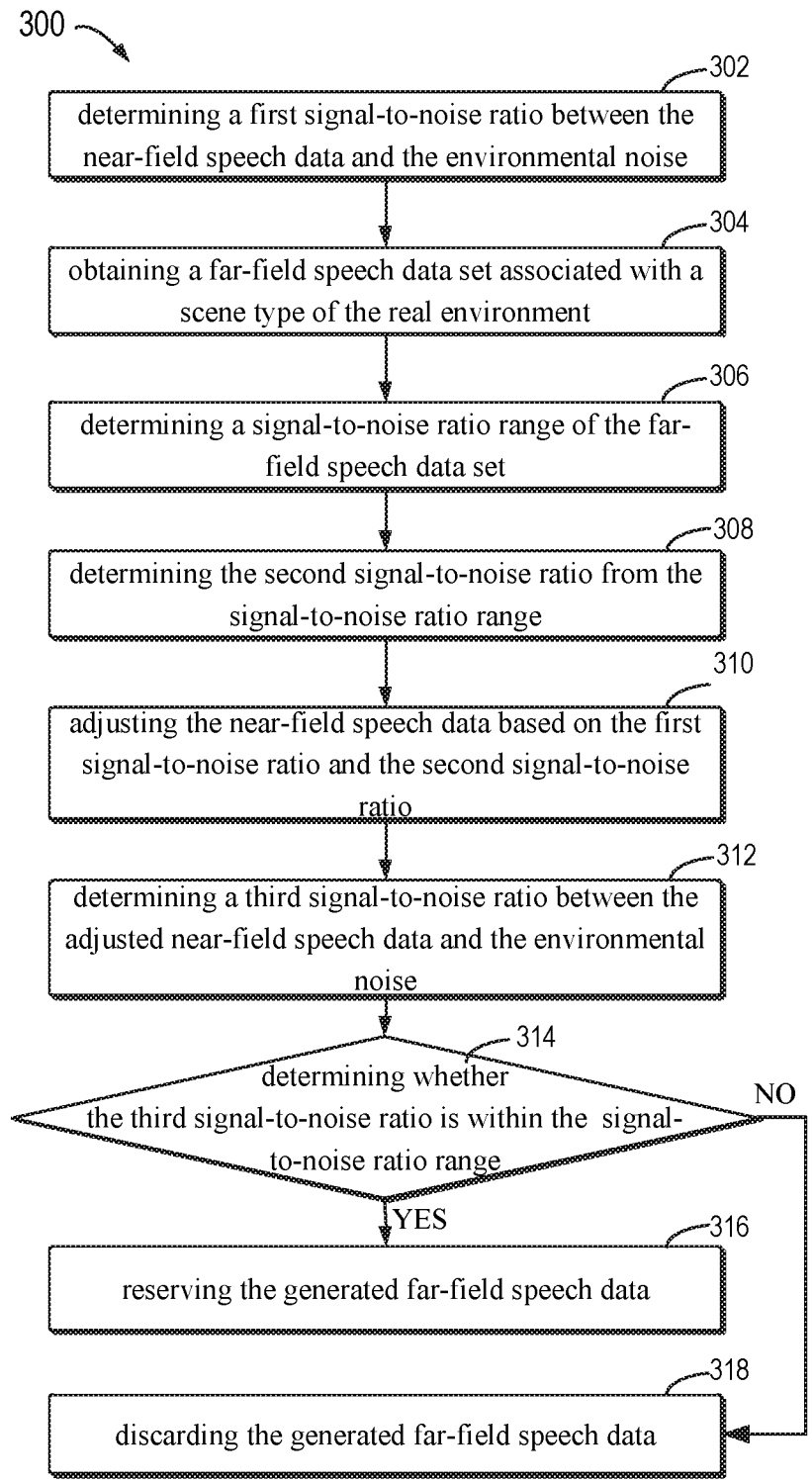
FIG. 3 is a flow chart of a method for verifying a generated far-field speech data according to an embodiment of the present disclosure.

FIG. 3 is a flow chart of a method 300 for verifying a generated far-field speech data according to an embodiment of the present disclosure. It should be understood that, the method 300 may be implemented by the far-field speech data generation device 120 illustrated in FIG. 1. Steps at blocks 302-310 in the method 300 may be sub steps of the step at block 206 illustrated in FIG. 206, and steps at blocks 312-314 may be implemented after the step at block 208 illustrated in FIG. 2 or be sub steps of the step at block 208. It should be understood that, although the method 300 includes steps at blocks 302-318, some embodiments of the present disclosure may include any combination of one or more of these steps.

At block 302, a first signal-to-noise ratio between the near-field speech data and the environmental noise is determined. For example, the far-field speech data generation device 120 calculates a first energy value of a quiet near-field speech segmentation obtained from the near-field speech data set 130, and calculates a second energy value of the environmental noise obtained from the speech collection device 110. Then the far-field speech data generation device 120 determines a ratio of the first energy value to the second energy value as the first signal-to-noise ratio, SNR1 for short.

Following at blocks 304-308, a second signal-to-noise ratio associated with the real environment is obtained. For example, the second signal-to-noise ratio may represent an actual signal-to-noise ratio or an expected signal-to-noise ratio in a certain type of real scene. According to environment in which the far-field speech recognition is used, types of using scene may include a home scene, an in-vehicle scene, an office scene, a roadside scene, and the like.

At block 304, a far-field speech data set associated with a scene type of the real environment is obtained. For example, if the environmental noise is collect from the home scene, a certain amount of data in the far-field speech data set actually collected from the home scene may be obtained. At block 306, a signal-to-noise ratio range S of the far-field speech data set is determined. A signal-to-noise ratio and a scene type of each piece of the far-field speech data may be labeled in the far-field speech data set. Therefore, for a certain scene type, an actual distribution range of signal-to-noise ratio in a certain scene type may be calculated. In some embodiments, a real distribution range of signal-to-noise ratio in various scene types may be obtained in other ways. At block 308, the second signal-to-noise ratio is determined from the signal-to-noise ratio range. For example, one signal-to-noise ratio may be randomly selected from the range S as an expected signal-to-noise ratio, i.e., the second signal-to-noise ratio, SNR2 for short.

At block 310, the near-field speech data is adjusted based on the first signal-to-noise ratio and the second signal-to-noise ratio. For example, a ratio R of the first signal-to-noise ratio SNR1 to the second signal-to-noise ratio SNR2 may be determined as a zooming ratio. An amplitude value of the near-field speech data may be zoomed according to the ratio R. For example, the amplitude value of the near-field speech data may be enlarged according to the ratio R.

Alternatively, at block 312, a third signal-to-noise ratio between the adjusted near-field speech data and the environmental noise is determined. For example, a signal-to-noise ratio is re-calculated for the adjusted near-field speech data as the third signal-to-noise ratio, SNR3 for short. At block 314, it is determined whether the third signal-to-noise ratio SNR3 is within the actual signal-to-noise ratio range S of the scene, in response to determining that the third signal-to-noise ratio SNR3 is within the signal-to-noise ratio range S, the generated far-field speech data is reserved at block 316. Otherwise, in response to determining that the third signal-to-noise ratio is out of the signal-to-noise ratio range S, the generated far-field speech data is discarded at block 318. By verifying whether the generated far-field speech data conforms to the actual signal-to-noise ratio range, the reliability of the generated far-field speech data can be ensured.

Figure 4:
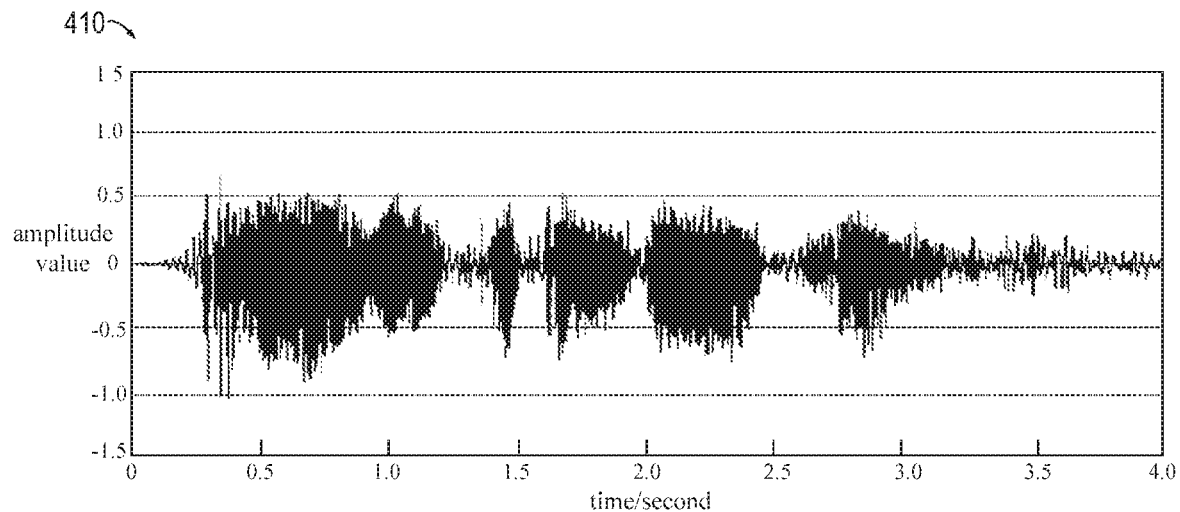
FIG. 4 is an amplitude value schematic diagram 410 of quiet near-field speech data according to an embodiment of the present disclosure.
Figure 5:
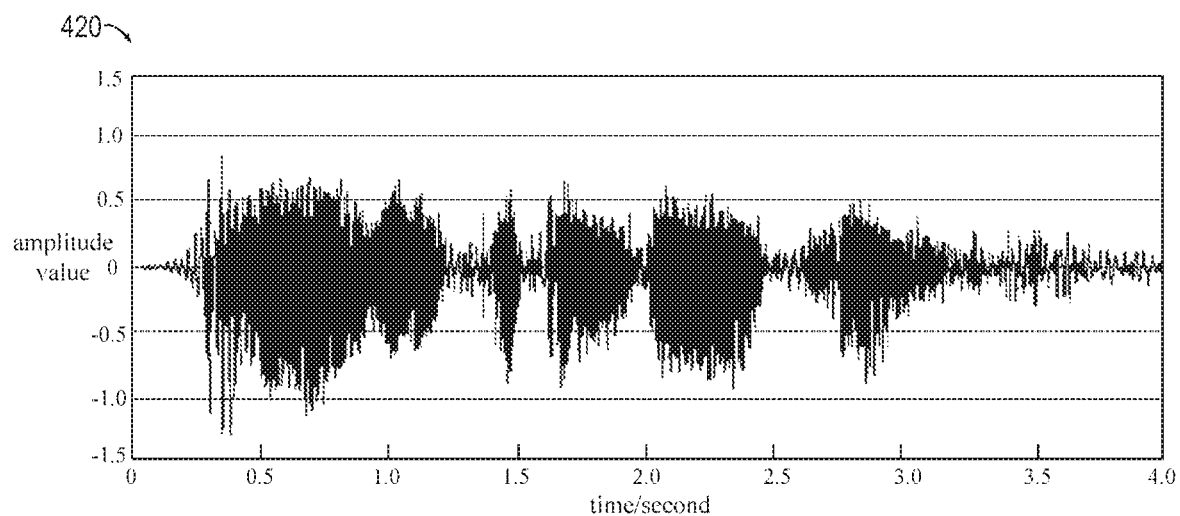
FIG. 5 is a schematic diagram illustrating amplitude values of adjusted near-field speech data according to an embodiment of the present disclosure.
Figure 6:
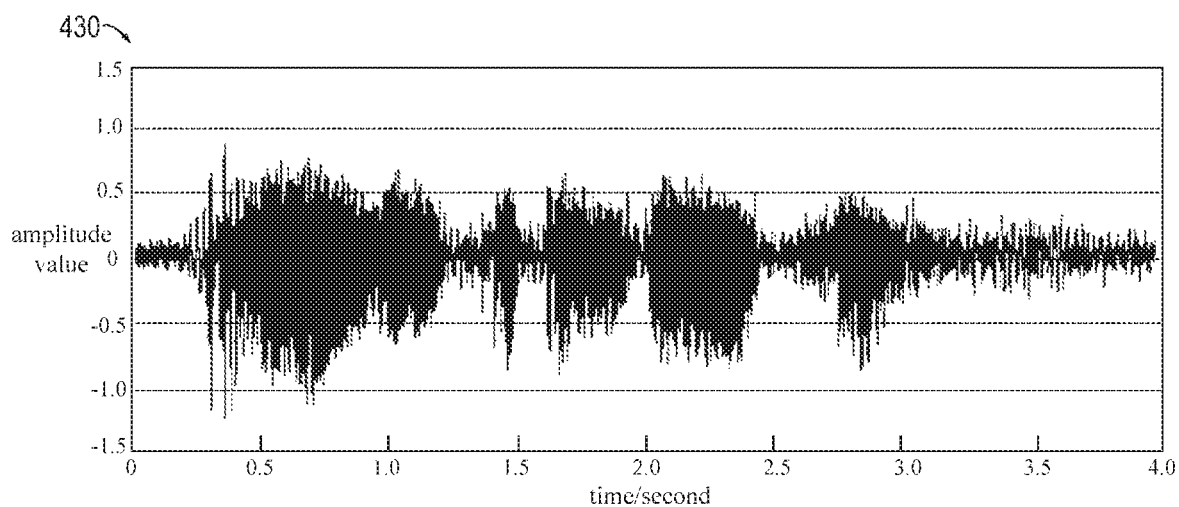
FIG. 6 is a schematic diagram illustrating amplitude values of generated far-field speech data according to an embodiment of the present disclosure.

FIGS. 4-6 are schematic diagrams illustrating simulating far-field speech data using near-field speech data according to an embodiment of the present disclosure. FIG. 4 is an amplitude value schematic diagram 410 of quiet near-field speech data according to an embodiment of the present disclosure. For example, the amplitude value schematic diagram 410 may be an amplitude value schematic diagram of the near-field speech data in the near-field speech data set 130 illustrated in FIG. 1.

With embodiments of the present disclosure, the near-field speech data may be adjusted based on the environmental noise. For example, in a certain scene type, during using a device based on a far-field speech recognition model, the user often increase his\her specking volume because of long distance and existed noise. Therefore, in order to more objectively and truly reflect the far-field speech data in the actual scene, the near-field speech data may be enlarged accordingly. For example, FIG. 5 is an amplitude value schematic diagram 420 of adjusted near-field speech data according to an embodiment of the present disclosure. Comparing with the amplitude value schematic diagram 410, amplitude values of signals in the amplitude value schematic diagram 420 are amplified to some extent.

After the quiet near-field speech data is adjusted, the noise adding processing is performed on the adjusted near-field speech data using the environmental noise, thereby the simulated far-field speech data is generated. FIG. 6 is an amplitude value schematic diagram 430 of the generated far-field speech data according to an embodiment of the present disclosure. Comparing with the amplitude value schematic diagram 420, noise is added to signals in the amplitude value schematic diagram 430, thereby generating the simulated far-field speech data is realized by adding noise to the near-field speech data.

Figure 7:
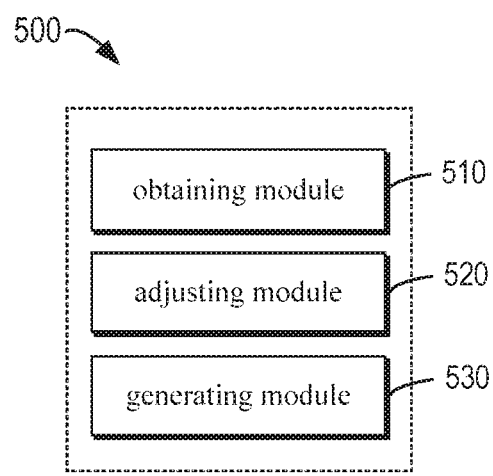
FIG. 7 is a block diagram illustrating a device for generating far-field speech data according to an embodiment of the present disclosure.

FIG. 7 is a block diagram illustrating a device for generating far-field speech data according to an embodiment of the present disclosure. As illustrated in FIG. 7, the device 500 for generating far-field speech data includes an obtaining module 510, an adjusting module 520, and a generating module 530. The obtaining module 510 is configured to obtain environmental noise in real environment. The adjusting module 520 is configured to adjust near-field speech data in a near-field speech data set based on the environmental noise. The generating module 530 is configured to generate far-field speech data based on adjusted near-field speech data and the environmental noise.

In some embodiments, the adjusting module 520 includes a first determining sub module, an obtaining sub module, and a first adjusting sub module. The first determining sub module is configured to determine a first signal-to-noise ratio between the near-field speech data and the environmental noise. The obtaining sub module is configured to obtain a second signal-to-noise ratio associated with the real environment. The first adjusting sub module is configured to adjust the near-field speech data based on the first signal-to-noise ratio and the second signal-to-noise ratio. In some embodiments, the obtaining sub module includes an obtaining unit, a first determining unit, and a second determining unit. The obtaining unit is configured to obtain a far-field speech data set associated with a scene type of the real environment. The first determining unit is configured to determine a signal-to-noise ratio range of the far-field speech data set. The second determining unit is configured to determine the second signal-to-noise ratio from the signal-to-noise ratio range.

In some embodiments, the device 500 further includes a determining module, a reserving module, and a discarding module. The determining module is configured to determine a third signal-to-noise ratio between the adjusted near-field speech data and the environmental noise. The reserving module is configured to reserve, in response to the third signal-to-noise ratio being within the signal-to-noise ratio range, the far-field speech data. The discarding module is configured to discard, in response to the third signal-to-noise ratio being out of the signal-to-noise ratio range, the far-field speech data. In some embodiments, the adjusting module further includes a second adjusting sub module, configured to adjust a signal amplitude value of the near-field speech data based on a ratio of the first signal-to-noise ratio to the second signal-to-noise ratio.

In some embodiments, the obtaining module 510 includes a collecting sub module, a second determining sub module, and a third adjusting sub module. The collecting sub module is configured to collect the environmental noise. The second determining sub module is configured to determine a mean value and a variance of signal amplitude values of the environmental noise. The third adjusting sub module is configured to adjust the signal amplitude values of the environmental noise based on the mean value and the variance. In some embodiments, the generating module 530 includes a noise adding sub module, configured to perform noise adding processing on the adjusted near-field speech data using the environmental noise. In some embodiments, the device 500 further includes a training module, configured to train a far-field speech recognition model using the far-field speech data.

It should be understood that, the obtaining module 510, the adjusting module 520 and the generating module 530 may be included in the far-field speech data generation device 120 illustrated in FIG. 1. Further, it should be understood that, modules illustrated in FIG. 7 may implement the steps or actions in the methods or processes according to embodiments of the present disclosure.

Figure 8:
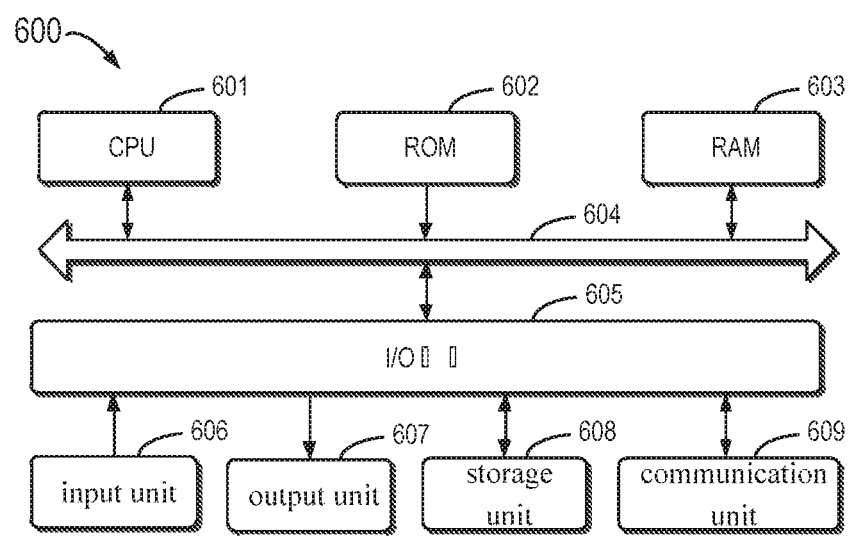
FIG. 8 is a block diagram illustrating a computer device according to a plurality of embodiments of the present disclosure.

FIG. 8 is a schematic diagram illustrating a device 600 that may be configured to implement embodiments of the present disclosure. The device 600 may be used to implement the device 500 for generating far-field speech data of the present disclosure. As illustrated in FIG. 8, the device 600 includes a central processing unit (CPU for short) 601, which can perform various appropriate actions and processes according to computer program instructions stored in a read only memory (ROM) 602 or computer program instructions loaded from a memory unit 608 into a random access memory (RAM) 603. The RAM 603 may further store various programs and data required for the operation of the device 600. The CPU 601, the ROM 602 and the RAM 603 are connected to each other through a bus 604. An input/output (I/O) interface 605 is also connected to the bus 604.

A plurality of components in device 600 are connected to the I/O interface 605. The components includes: an input unit 606, such as a keyboard, mouse, etc., an output unit 607, such as various types of displays, speakers, etc., a storage unit 608, such as a disk, an optical disk, etc., and a communication unit 609, such as a network card, a modem, a wireless communication transceiver, and the like. The communication unit 609 allows the device 600 to exchange information/data with other devices over a computer network such as the Internet and/or various telecommunication networks.

The processing unit 601 performs the various methods and processes described above, such as the method 200 and/or the method 300. For example, in some embodiments, the method 200 and/or the method 300 may be implemented as a computer software program that is tangibly embodied in a machine readable medium, such as the storage unit 608. In some embodiments, some or all of the computer programs can be loaded and/or installed onto the device 600 via the ROM 602 and/or the communication unit 609. One or more acts or steps of the method 200 and/or the method 300 described above may be performed when a computer program is loaded into the RAM 603 and executed by the CPU 601. Alternatively, in other embodiments, the CPU 601 may be configured to perform the method 200 and/or the method 300 by any other suitable means (e.g., by means of firmware).

The functions described above may be performed at least in part by one or more hardware logic components. For example, and without limitation, exemplary types of hardware logic components that may be used include: a field programmable gate array (FPGA), and application specific integrated circuit (ASIC), an application specific standard product (ASSP), a system on chip (SOC), a load programmable logic device (CPLD), and the like.

Program codes for implementing the methods of the present disclosure may be written in any combination of one or more programming languages. The program codes may be provided to a processor or controller of a general-purpose computer, a special-purpose computer or other programmable data processing apparatus, such that the program codes, when executed by the processor or the controller, enable the functions specified in the flow charts and/or block diagrams to be implemented. The program codes may be entirely executed on a machine, partially executed on the machine, partially executed on the machine as a stand-alone software package and partially executed on a remote machine, or entirely executed on the remote machine or a server.

In the context of the present disclosure, a machine-readable medium can be a tangible medium that can contain or store a program for use by or in connection with an instruction execution system, apparatus, or device. The machine readable medium can be a machine readable signal medium or a machine readable storage medium. The machine-readable medium may include, but is not limited to, an electronic, magnetic, optical, electromagnetic, infrared, or semiconductor system, apparatus, or device, or any suitable combination of the foregoing. More specific examples of the machine readable storage media may include electrical connections based on one or more wires, a portable computer disk, a hard disk, a random access memory (RAM), a read-only memory (ROM), an erasable programmable read-only memory (EPROM or flash memory), an optical fiber device, a portable compact disk read-only memory (CD-ROM), an optical storage device, a magnetic storage device, or any suitable combination of the foregoing.

In addition, although the acts or steps are described in a particular order, this should be understood that such acts or steps are required to be performed in the particular order or in the sequence shown, or all illustrated acts or steps should be executed to achieve a desired result. Multitasking and parallel processing may be advantageous in certain circumstances. Likewise, although several specific implementation details are included in the above description, these should not be construed as limiting the scope of the present disclosure. Certain features that are described in the context of separate embodiments can also be implemented in combination in a single implementation. Instead, various features that are described in the context of a single implementation can be implemented in a plurality of implementations, either individually or in any suitable sub-combination.

Although the embodiments of the present disclosure have been described in terms of specific structural features and/or methodological acts, it is understood that the subject matters defined in the appended claims are not limited to the specific features or acts described above. Instead, the specific features and acts described above are merely exemplary forms of implementing the claims.

What is claimed is:

1. A method for generating far-field speech data, comprising:
   obtaining environmental noise in real environment;
   adjusting near-field speech data in a near-field speech data set based on the environmental noise; and
   generating far-field speech data based on adjusted near-field speech data and the environmental noise.

2. The method according to claim 1, wherein adjusting the near-field speech data in the near-field speech data set based on the environmental noise comprises:
   determining a first signal-to-noise ratio between the near-field speech data and the environmental noise;
   obtaining a second signal-to-noise ratio associated with the real environment; and
   adjusting the near-field speech data based on the first signal-to-noise ratio and the second signal-to-noise ratio.

3. The method according to claim 2, wherein obtaining the second signal-to-noise ratio associated with the real environment comprises:
   obtaining a far-field speech data set associated with a scene type of the real environment;
   determining a signal-to-noise ratio range of the far-field speech data set; and
   determining the second signal-to-noise ratio from the signal-to-noise ratio range.

4. The method according to claim 3, further comprising:
   determining a third signal-to-noise ratio between the adjusted near-field speech data and the environmental noise;
   in response to the third signal-to-noise ratio being within the signal-to-noise ratio range, reserving the far-field speech data; and
   in response to the third signal-to-noise ratio being out of the signal-to-noise ratio range, discarding the far-field speech data.

5. The method according to claim 2, wherein adjusting the near-field speech data in the near-field speech data set based on the environmental noise further comprises:
   adjusting a signal amplitude value of the near-field speech data based on a ratio of the first signal-to-noise ratio to the second signal-to-noise ratio.

6. The method according to claim 1, wherein obtaining the environmental noise in real environment comprises:
   collecting the environmental noise;
   determining a mean value and a variance of signal amplitude values of the environmental noise; and
   adjusting the signal amplitude values of the environmental noise based on the mean value and the variance.

7. The method according to claim 1, wherein generating the far-field speech data based on adjusted near-field speech data and the environmental noise comprises:
   performing noise adding processing on the adjusted near-field speech data using the environmental noise.

8. The method according to claim 1, further comprises:
   training a far-field speech recognition model using the far-field speech data.

9. A device for generating far-field speech data, comprising:
   one or more processors,
   a memory storing one or more software modules executable by the one or more processors, wherein the one or more software modules comprises:
   an obtaining module, configured to obtain environmental noise in real environment;

an adjusting module, configured to adjust near-field speech data in a near-field speech data set based on the environmental noise; and a generating module, configured to generate far-field speech data based on adjusted near-field speech data and the environmental noise.

10. The device according to claim 9, wherein the adjusting module comprises:

a first determining sub module, configured to determine a first signal-to-noise ratio between the near-field speech data and the environmental noise;

an obtaining sub module, configured to obtain a second signal-to-noise ratio associated with the real environment; and a first adjusting sub module, configured to adjust the near-field speech data based on the first signal-to-noise ratio and the second signal-to-noise ratio.

11. The device according to claim 10, wherein the obtaining sub module comprises:

an obtaining unit, configured to obtain a far-field speech data set associated with a scene type of the real environment;

a first determining unit, configured to determine a signal-to-noise ratio range of the far-field speech data set; and a second determining unit, configured to determine the second signal-to-noise ratio from the signal-to-noise ratio range.

12. The device according to claim 11, wherein the one or more software modules further comprise:

a determining module, configured to determine a third signal-to-noise ratio between the adjusted near-field speech data and the environmental noise;

a reserving module, configured to reserve, in response to the third signal-to-noise ratio being within the signal-to-noise ratio range, the far-field speech data; and a discarding module, configured to discard, in response to the third signal-to-noise ratio being out of the signal-to-noise ratio range, the far-field speech data.

13. The device according to claim 10, wherein the adjusting module comprises:

a second adjusting sub module, configured to adjust a signal amplitude value of the near-field speech data based on a ratio of the first signal-to-noise ratio to the second signal-to-noise ratio.

14. The device according to claim 9, wherein the obtaining module comprises:

a collecting sub module, configured to collect the environmental noise;

a second determining sub module, configured to determine a mean value and a variance of signal amplitude values of the environmental noise; and a third adjusting sub module, configured to adjust the signal amplitude values of the environmental noise based on the mean value and the variance.

15. The device according to claim 9, wherein the generating module comprises:

a noise adding sub module, configured to perform noise adding processing on the adjusted near-field speech data using the environmental noise.

16. The device according to claim 9, wherein the one or more software modules further comprise:

a training module, configured to train a far-field speech recognition model using the far-field speech data.

17. A non-transitory computer readable storage medium, comprising instructions, wherein when the instructions are executed by a processor of a device to perform acts of:

obtaining environmental noise in real environment;

adjusting near-field speech data in a near-field speech data set based on the environmental noise; and generating far-field speech data based on adjusted near-field speech data and the environmental noise.

18. The non-transitory computer readable storage medium according to claim 17, wherein adjusting the near-field speech data in the near-field speech data set based on the environmental noise comprises:

determining a first signal-to-noise ratio between the near-field speech data and the environmental noise;

obtaining a second signal-to-noise ratio associated with the real environment; and adjusting the near-field speech data based on the first signal-to-noise ratio and the second signal-to-noise ratio.

19. The non-transitory computer readable storage medium according to claim 18, wherein obtaining the second signal-to-noise ratio associated with the real environment comprises:

obtaining a far-field speech data set associated with a scene type of the real environment;

determining a signal-to-noise ratio range of the far-field speech data set; and determining the second signal-to-noise ratio from the signal-to-noise ratio range.

20. The non-transitory computer readable storage medium according to claim 19, wherein the one or more software modules further comprise:

determining a third signal-to-noise ratio between the adjusted near-field speech data and the environmental noise;

in response to the third signal-to-noise ratio being within the signal-to-noise ratio range, reserving the far-field speech data; and in response to the third signal-to-noise ratio being out of the signal-to-noise ratio range, discarding the far-field speech data.

* * * * *